United States Patent [19]

Rosas

[11] Patent Number: 4,649,494

[45] Date of Patent: Mar. 10, 1987

[54] METHOD FOR MAINTAINING ZERO CALIBRATION VALUES IN ARTICLE SORTING MACHINE

[75] Inventor: Robin R. Rosas, Three Rivers, Calif.

[73] Assignee: Pennwalt Corporation, Philadelphia, Pa.

[21] Appl. No.: 625,935

[22] Filed: Jun. 29, 1984

[51] Int. Cl.⁴ .................................. G01G 19/04
[52] U.S. Cl. ................................. 364/478; 364/568; 364/571; 209/592; 177/25; 177/50
[58] Field of Search ............... 364/478, 567, 568, 581, 364/571, 575; 209/552, 592; 177/25, 50, DIG. 3

[56] References Cited

U.S. PATENT DOCUMENTS

| | | | |
|---|---|---|---|
| 3,868,643 | 2/1975 | Bullivant | 364/567 |
| 3,976,150 | 8/1976 | Wilson | 364/567 |
| 4,106,628 | 8/1978 | Warkentin | 209/698 |
| 4,139,069 | 2/1979 | Domis et al. | 364/567 |
| 4,139,070 | 2/1979 | Hanson et al. | 364/567 |
| 4,316,516 | 2/1982 | Kupper | 177/25 |
| 4,413,739 | 11/1983 | Kohashi | 364/567 |
| 4,466,499 | 8/1984 | Minamida | 177/25 |
| 4,512,428 | 4/1985 | Bullivant | 364/568 |
| 4,525,794 | 6/1985 | Scheffer et al. | 364/567 |
| 4,529,050 | 7/1985 | Mosher | 364/567 |

Primary Examiner—Jerry Smith
Assistant Examiner—Allen MacDonald
Attorney, Agent, or Firm—Seidel, Gonda, Goldhammer & Abbott

[57] ABSTRACT

A method for maintaining zero calibration values representative of average tare, or average empty cup weight, in an article sorting machine of the type employing cups to sort articles by weight comprises the steps of measuring the weight of each cup, and if the cup is carrying an article, the weight of the cup and the article, passing over an electronic scale, and determining whether the cup is carrying an article based upon the value of a weight signal provided by the electronic scale. A running sum of the values of the weight signals for the cups determined not to be carrying articles is maintained. A count of the number of cups determined not to be carrying articles is also maintained. After a selected interval, the running sum is divided by the count to arrive at an updated average tare, or updated average empty cup weight. The updated average empty cup weight is subtracted from the value of the weight signal for cups determined to be carrying articles to arrive at an article weight value which is indicative of the weight of the article alone. The article weight value is used to classify the article into one of a plurality of weight breaks for sorting the article according to its weight.

9 Claims, 4 Drawing Figures

METHOD FOR MAINTAINING ZERO CALIBRATION VALUES IN ARTICLE SORTING MACHINE

BACKGROUND OF THE INVENTION

The present invention is directed to improvements in article sorting machines. Specifically, the present invention is directed to a method for updating and maintaining zero calibration values representative of the average empty cup weight stored in article sorting machines of the type employing cups to sort articles. The average empty cup weight, also known as the average tare, is employed by the article sorting machine to determine the weight of the article being transported by the cup.

Article sorting machines are known. U.S. Pat. No. 4,106,628 discloses an article sorting machine for sorting articles according to weight. The article sorting machine comprises a plurality of cups connected in a continuous belt for carrying the articles to be sorted. The cups are transported over an electronic weight station which provides a weight signal for each cup transported thereover. The weight signal has a value representative of the weight of the cup carried over the weight station, and if the cup is carrying an article, the weight of the cup and the article.

According to U.S. Pat. No. 4,106,628, electronic circuitry compares the weight signal to a plurality of reference values called weight cutoffs or thresholds set by the operator of the machine. The ranges between successive weight cutoffs define weight breaks. After the article is weighed and classified into a weight break, the cup is transported over a plurality of discharge stations where the article is discharged from the cup at a selected one of the discharge locations depending upon the weight break into which the article has been classified.

The aforementioned patent teaches the use of a potentiometer in the electronic weight scale circuitry to compensate for the weight of the cup. The potentiometer is manually set to provide a reference value which most nearly corresponds to the weight signal provided by the weight scale when an empty cup passes thereover. In this manner, the weight station provides a weight signal compensated for cup weight, depending upon the setting of the potentiometer.

A problem with the aforementioned compensation circuit is that it cannot automatically adjust the value of the reference signal to compensate for the additional weight that an empty cup acquires due to dirt, grime, etc. which accumulates in the cup during a sorting process. Some schemes have been developed to provide such adjustment. For example, in one known scheme, the electronic circuit disclosed in aforementioned U.S. Pat. No. 4,106,628 is replaced with a microcomputer and programmed to perform the hardware functions disclosed therein utilizing well-known programming techniques. The microcomputer is further programmed to sense when an empty cup passes over the weight scale by comparing the value of the weight signal to a reference signal. If the value of the weight signal fails to exceed the value of the reference signal, the microcomputer assumes that an empty cup is present on the weight scale and stores the value of the weight signal corresponding to that cup in a memory location corresponding to that cup. Thus, according to this scheme, a lookup table is provided in a section of memory, and each cup is assigned a location in the lookup table. The computer stores the empty cup weight for each cup in the lookup table. Each time an empty cup passes over the weight scale, the new value of the weight signal replaces the old value stored in the lookup table. However, if a cup carrying an article passes over the weight station, the value of the cup weight stored in the lookup table is used as the tare to compute the weight of the article alone.

One of the drawbacks of the aforementioned lookup table method is that it requires substantial memory and processing time. Thus, one memory location is required for each cup in the machine. The microcomputer is required to, for each cup passing over the weight scale, determine the memory location of the tare value for the cup over the scale, retrieve that value from the lookup table and subtract it from the weight value for the cup and article over the scale. This process is inefficient in terms of processing time.

It is therefore desirable to provide a method for updating and storing values indicative of average tare which requires only minimum memory requirements and requires minimum processing time.

SUMMARY OF THE INVENTION

A method for updating values representative of average tares stored in a memory section of an electronic controller for an article sorting machine of the aforementioned type comprises the steps of:

(a) providing, via a user operable data entry means, such as a keyboard, data representative of at least one threshold value. In the preferred embodiment, this threshold value is the lowest weight cutoff for the lowest weight break.

(b) providing an initial value representative of the average tare and storing the initial value in a selected memory location of the memory section. In the preferred embodiment, the initial tare value is obtained by running the machine without any articles thereon.

(c) obtaining the weight signal provided by the weight station each time a cup is transported thereover;

(d) retrieving the initial tare value and subtracting it from the value of the weight signal. The resulting value defines an article weight value.

(e) comparing the article weight value to the lowest weight cutoff and determining whether the cup is carrying an article based upon the result of the comparision. In the preferred embodiment, if the article weight value fails to exceed the lowest weight cutoff, a determination is made that the cup is empty, i.e., the cup is not carrying an article.

(f) maintaining a running sum of the values of the weight signals for the cups determined not to be carrying articles.

(g) maintaining a count, called an empty cup count, representative of the number of cups determined not to be carrying articles.

(h) dividing the running sum by the empty cup count. The result of the division is defined as an updated average tare value.

(i) replacing the initial tare value stored in the selected memory location with the updated average tare just computed.

The method also comprises the steps of classifying the article into one of a plurality of weight breaks, or categories, when the cup is determined to be carrying an article by comparing the article weight value to the weight cutoffs. The article weight value is compared to the weight cutoffs and classified into one of the weight breaks based upon the result of the comparison. The method further comprises transporting the cup over a plurality of discharge stations and discharging the article from the cup at a selected one of the discharge stations based upon the weight break or category into which the article has been classified.

In the preferred embodiment, the method also comprises the steps of determining when the empty cup count reaches a preselected count, and fixing the running sum at its current value when the empty cup counter reaches the preselected count, and performing the division only after the preselected count has been reached.

DETAILED DESCRIPTION OF THE INVENTION

Figure 1:
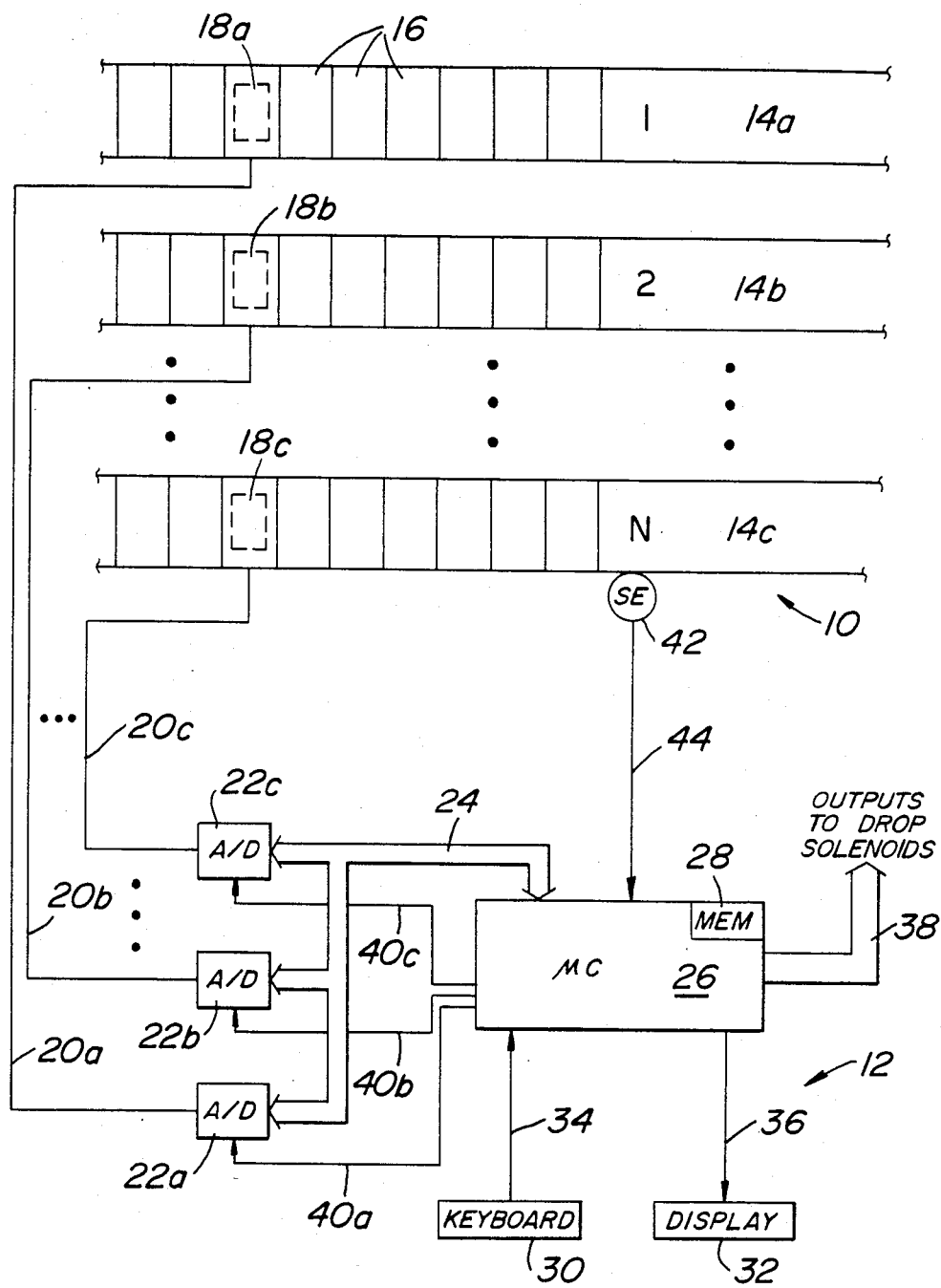
FIG. 1 is a block diagram of an article sorting machine and electronic controller therefore.

Referring now to the drawings, wherein like numerals represent like elements, there is shown in FIG. 1 an article sorting machine labelled generally 10. The operation of article sorting machine 10 is controlled by an electronic controller 12. Article sorting machine 10 comprises a plurality, N, of parallel cup conveyors, labelled generally 14a, 14b and 14c. Although only three conveyors, or lanes, are shown, it should be understood that any desired number of lanes can be employed. In the preferred embodiment, a maximum of 9 lanes can be provided. Each lane 14 comprises a plurality of cups 16 connected in a continuous belt, as more fully explained in aforementioned U.S. Pat. No. 4,106,628. As also described in detail in U.S. Pat. No. 4,106,628, disposed beneath the path of travel of the cups in each lane is a weight scale 18. Thus, weight scale 18a is beneath the path of the cups 16 in lane 14a, weight scale 18b is beneath the path of travel of cups 16 in lane 14b etc. Preferably, each weight scale 18 is an electronic scale, such as a strain gauge, or other similar electronic device which converts pressure into an electrical signal. The electrical signals from the weight scales 18a, 18b, 18c are provided via conductors 20a, 20b, and 20c, respectively, to analog to digital converters 22a, 22b, 22c, respectively. It will be appreciated, that although one analog to digital converter is shown for each lane 14, the same result could be achieved using only a single analog to digital converter and well-known multiplexing techniques. Each analog to digital converter 22a, 22b and 22c converts the analog weight signal present on its respective conductor 20 to a corresponding digital value. The digital values, also referred to herein as digital weight values, from each analog to digital converter 22 are supplied via a bus 24 to microcomputer 26. Microcomputer 26 controls the operation of each analog to digital converter 22a, 22b and 22c via control lines 40a, 40b and 40c respectively.

Microcomputer 26 also receives a signal from a shaft encoder 42 via conductor 44. As explained in detail in aforementioned U.S. Pat. No. 4,106,628, shaft encoder 42 provides a pulse each time the cups 16 have been transported a preselected distance. In a preferred embodiment, shaft encoder 42 provides a pulse on conductor 44 each time a new cup 16 is positioned over a weight scale 18. It will be appreciated by those skilled in the art that microcomputer 26 may be programmed to provide proper signals on lines 40a, 40b and 40c to initiate an analog to digital conversion each time shaft encoder 42 provides a pulse. In this manner, microcomputer 26 receives a digital weight signal for each cup 16 passing over its respective weight scale 18.

Controller 12 also comprises a keyboard 30 communicating with microcomputer 26 via conductors 34. Also provided is a display 32 communicating with microcomputer 26 via conductors 36. Data such as the weight cutoff values for the weight break classifications are entered by the user via keyboard 30. Also entered via keyboard 30 is data representative of the discharge location assigned to each weight break. Display 32 provides the user with information indicative of the programmed weight breaks and drop locations or discharge stations assigned to each weight break.

Microcomputer 26 communicates with each of the discharge stations via a bus 38. Thus, as described in detail in aforementioned U.S. Pat. No. 4,106,628, the discharge stations may be selectively actuated to discharge the article at a selected one of the discharge stations according to the weight break into which it has been classified.

Microcomputer 26 also has a section of memory 28. Memory 28 stores the operating instructions for the microcomputer, which are preferably stored in ROM. RAM is also provided for storing temporary data, such as the digital weight values, weight cutoffs, etc. A section of memory 28 (RAM) is also reserved for storing the average tare to be computed according to the inventive method.

It will appreciated by those skilled in the art that microcomputer 66 may be programmed, using well known programming techniques, to emulate the hardware control functions disclosed in U.S. Pat. No. 4,106,628. Thus, microcomputer 26 is programmed to perform all of the functions performed by the hardware circuit disclosed in U.S. Pat. No. 4,106,628.

Figure 2:
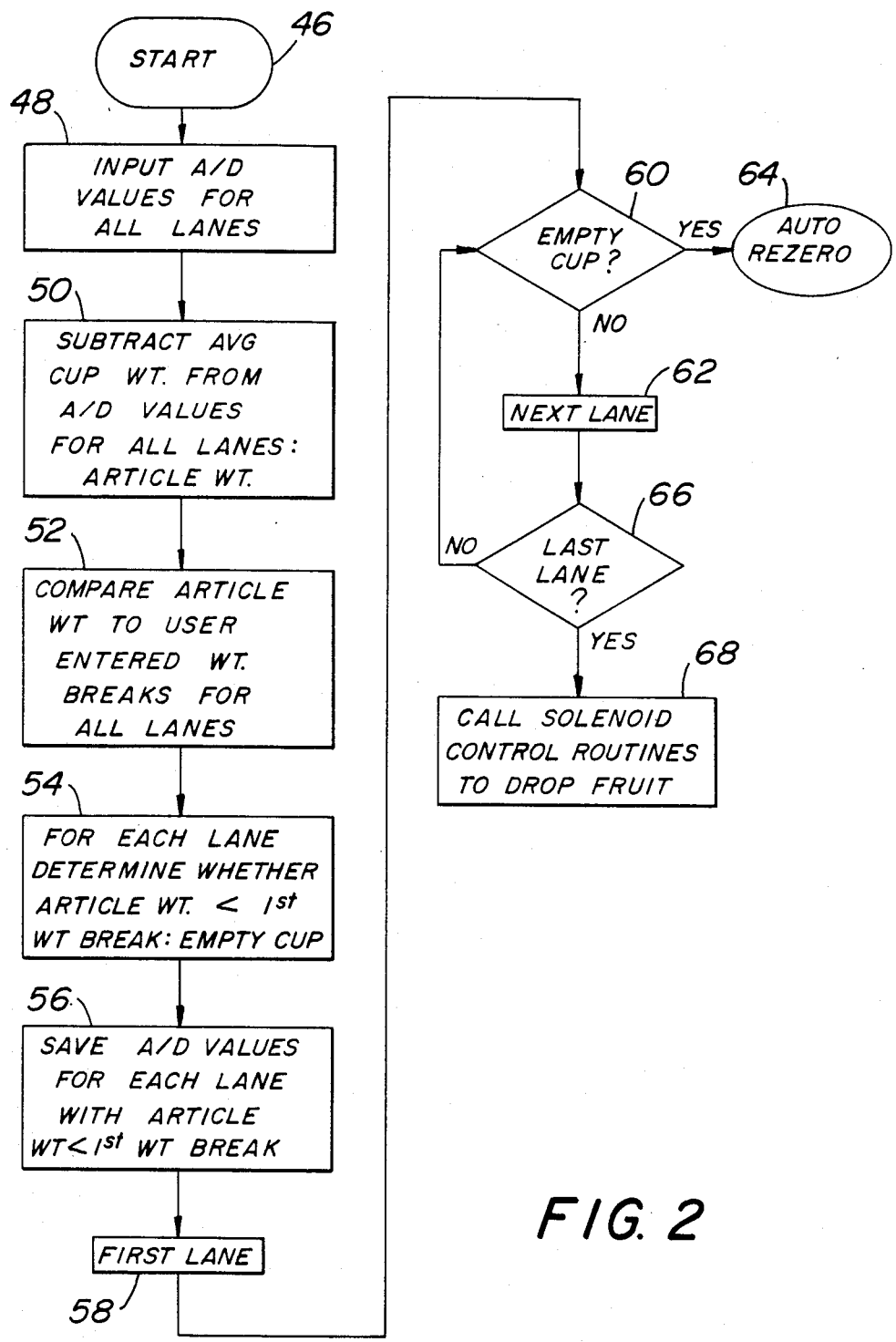
FIG. 2–4 are flow charts illustrating the method employed in the present invention.

Turning now to FIG. 2, the inventive method will be described in detail.

The START routine 46 shown on figure is entered each time shaft encoder 42 provides a pulse indicating that a cup is over the weight scale. Alternatively, as will be understood by those skilled in the art, it may be desired to wait until each analog to digital converter has completed its conversion and has provided a "READY" signal to microcomputer 26. In any event, the START routine 46 illustrated in FIG. 2 is entered when digital weight data is available for processing by the microcomputer 26.

It will be understood that the disclosed algorithm may be programmed into any well known microcomputer, although in a preferred embodiment a Motorola 6809 microprocessor is utilized. Those skilled in the art will appreciate that the method disclosed in FIGS. 2–5 may readily be converted into suitable program code for execucution by microcomputer 26.

Upon entering the START routine 46, control immediately passes to block 48. At block 48, microcomputer 26 reads the digital weight values presented by each analog to digital converter 22. Thus, a digital weight value corresponding to each of the cups 16 over the weight scale 18 is read by microcomputer 26. Control then passes to block 50 where microcomputer 26 subtracts an average empty cup weight initially stored in a memory location from each of the digital weight values presented by the analog to digital converters 22. The initial value of the average empty cup weight, also referred to herein as the average tare or empty cup weight, may be provided in a number of different ways. For example, the initial value may be provided by the operator via keyboard 30. However, in the preferred embodiment, the initial values are obtained by operating the article sorting machine 10 in an unloaded condition, i.e., with no articles in the cups, so that initial average cup weights, or empty cup weights, can be determined. It will be appreciated that an individual average tare or empty cup weight is provided for each lane 14a, 14b and 14c. Thus, microcomputer 26 stores an average tare associated with lane 14a, a different average tare associated with lane 14b, and still a different average tare associated with lane 14c. The inventive method separately updates each of the average tares associated with each of the lanes 14a, 14b, 14c.

The subtraction at block 50 is performed for each of the lanes 14a, 14b and 14c. Thus, the initial average tare associated with lane 14a is subtracted from the digital weight value supplied by analog to digital converter 22a, etc. The result of each subtraction defines an article weight value. Control then passes to block 52 where each article weight value is compared to the weight cutoffs to determine which weight break the article carried by the cup should be classified into. Control then passes to block 54 where it is determined which, if any, of the article weight values are less than the lowest weight cutoff, i.e., whether any of the article weight values do not fall into a weight break. The microcomputer 26 determines that, for each article weight value which is less than the lowest weight cutoff, the cup 16 which produced the corresponding digital weight value is empty. Thus, for each of the cups 16 over the weight scales 18 in lanes 14a, 14b and 14c, a determination is made regarding which one of the cups is empty, i.e., not carrying an article.

Control then passes to block 56 where the digital weight values for those cups determined not to be carrying articles are stored in selected locations of memory 28 of microcomputer 26. Stated otherwise, the digital weight values for the cups which did not produce article weight values equal to or greater than the lowest weight cutoff value are stored in memory 28 of microcomputer 26. Control then passes to block 58 where a lane counter, L, is set to "1" corresponding to the first lane. As will become apparent, the lane counter, L, is used to sequentially process the empty cup data, if any, for each lane so as to update the average tare associated with that lane.

Control then passes to block 60. If, at block 54, it was determined that the cup in the first lane is empty, then, at block 60, control passes to the AUTO REZERO routine 64, which will be explained shortly. However, if it was determined that the cup in the first lane is not empty, control passes to block 62 where the lane counter, L, is incremented to correspond to the next lane. Control then passes to block 66 where a determination is made if the last lane has been reached. If the last lane has not been reached, control passes back to block 60 where, based upon the data provided by block 54 for the next lane, it is determined whether the cup which produced the digital weight value for the next lane is empty. Again, if the cup is empty, control passes to the AUTO REZERO routine 64. If the cup is not empty, the lane counter is incremented to go on to the next lane. It will be appreciated that, together blocks 60, 62 and 66 process, via AUTO REZERO routine 64, the digital weight data for empty cups.

At block 66, if a determination is made that the last lane has been reached, control passes to block 68. At block 68, selected discharge stations are selectively actuated to discharge articles which were previously processed and have now reached their selected discharge station. Apparatus and method for tracking the articles as they move from the weight station to the discharge locations, and for selectively actuating the proper discharge locations according to the article's weight break classification, is fully described in aforementioned U.S. Pat. No. 4,106,628.

Figure 3:
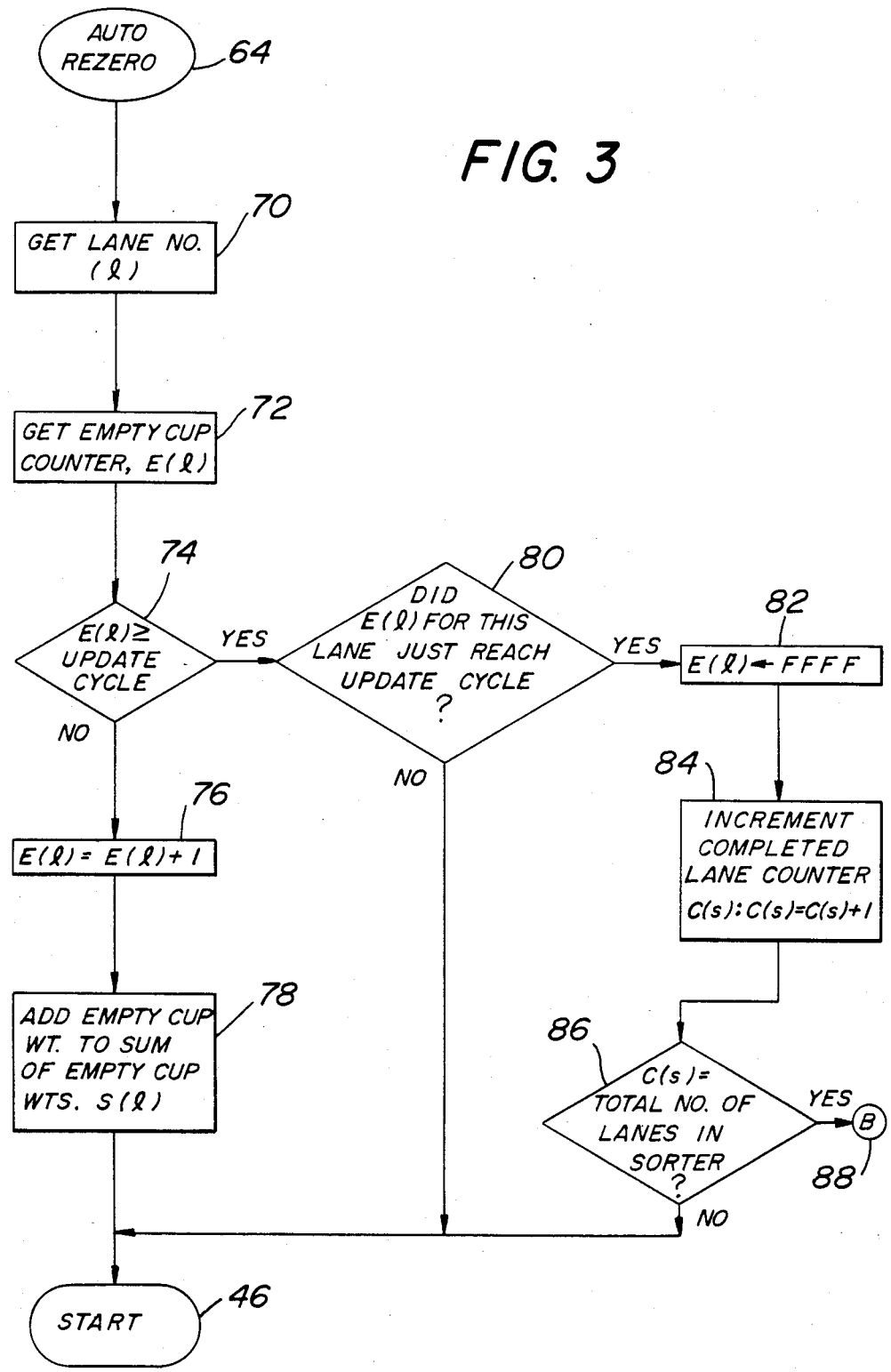
Figure 4:
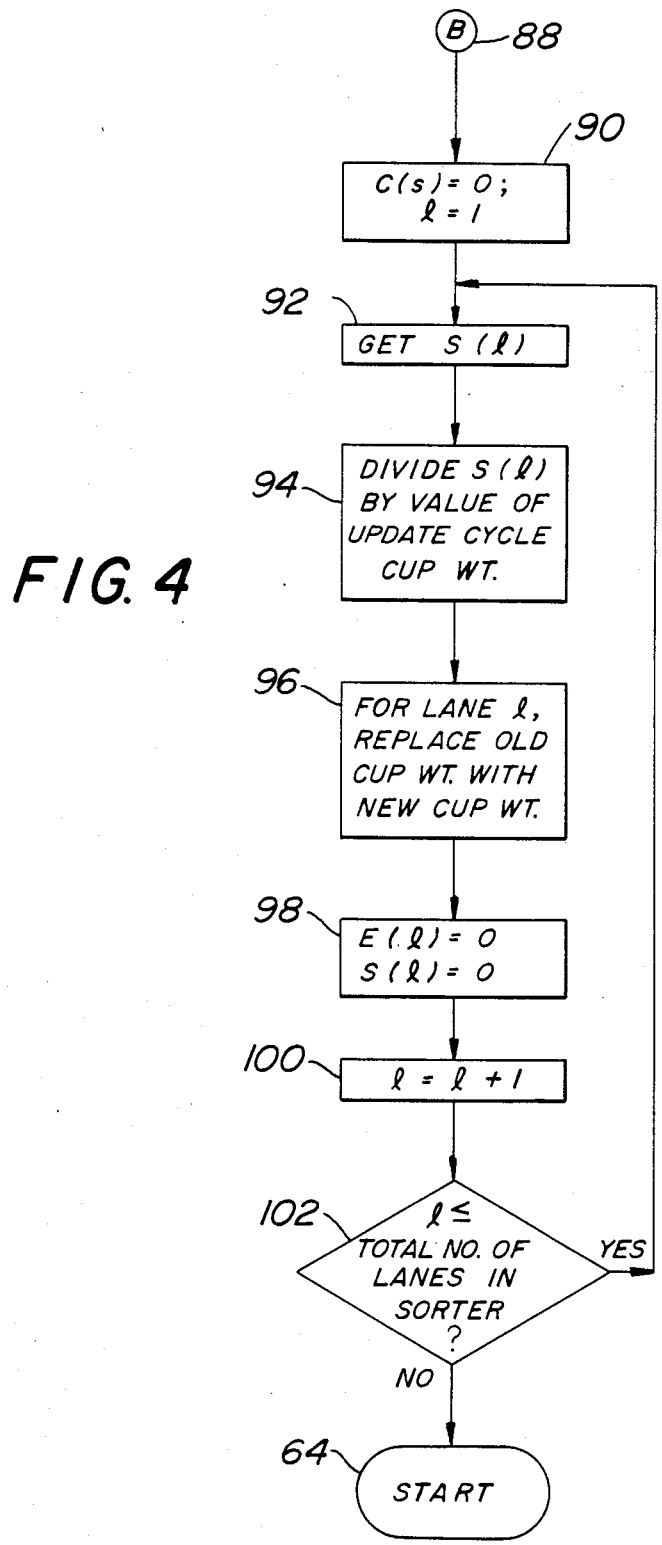

The AUTO REZERO routine 64 is illustrated in FIGS. 3 and 4 and will now be described in detail.

Upon entering the AUTO REZERO routine 64, control immediately passes to block 70. At block 70, the lane counter, L, is interrogated to determine which lane's digital weight data is now being processed. Control then passes to block 72 where the value of an empty cup counter, E, for this lane is obtained. As will become apparent, there is an empty cup counter E for each lane, and each empty cup counter maintains a count of the number of cups which have passed over that lane's weight scale 18 and which have been determined to be empty. For clarity, the empty cup counter has been labeled E(L) at block 72 to indicate that there is an empty cup counter for each lane. Thus, each time the AUTO REZERO routine 64 is entered, a different empty cup counter E will be called depending upon the value of the lane counter, L.

Control next passes to block 74 where the value of the empty cup counter for the current lane is compared to a preselected count called the UPDATE CYCLE. If the value of the empty cup counter for the current lane is greater than or equal to the UPDATE CYCLE, control passes to block 80. Thus, it is desired to go through the process of updating the average tare for the current lane if the value of the empty cup counter has now reached the value of the "UPDATE CYCLE". On the other hand, if the value of the empty cup counter, E, is less than the value of the UPDATE CYCLE, control passes to block 76 where the empty cup counter for this lane is incremented by one. Recall that the AUTO REZERO routine 64 is executed only for empty cups, so the empty cup counter E is incremented only when an empty cup has been detected.

Control then passes to block 78 where the digital weight value provided by the analog to digital converter corresponding to the current lane is added to a running sum, S, for this lane. It will be appreciated that a separate running sum, S, of digital weight values is maintained for each lane, so the running sum is designated S(L), where the value of L indicates the current lane. Thus, after block 78 is executed, there is, for the current lane, an empty cup count, E, having a value indicative of the number of empty cups which have passed over the corresponding weight scale 18 for this lane, and a running sum S(L) of the digital weight values corresponding to the empty cups in the current lane.

Control then passes back to the START ROUTINE 46.

As previously indicated, if it was determined at block 74 that the value of the empty cup counter E for the current lane was greater than or equal to the value of the UPDATE CYCLE, control passed to block 80. At block 80, a determination is made as to whether the value of the empty cup counter just reached the value of the UPDATE CYCLE. That is, a determination is made whether the value of the empty cup counter is exactly equal to the value of the UPDATE CYCLE. If the value of the empty cup counter for the current lane is greater than the value of the UPDATE CYCLE, control passes back to the START ROUTINE 46. On the other hand, if the value of the empty cup counter for the current lane is exactly equal to the value of the UPDATE CYCLE, control passes to block 82. At block 82, the value of the empty cup counter is modified by inserting therein an arbitrary value, in this case $FFFF_{16}$. Any arbitrary value greater than the value of the UPDATE CYCLE could be written into the empty cup counter for this lane, as long as microcomputer 16 recognizes the arbitrary value as an indication that the corresponding empty cup counter has reached the value of the UPDATE CYCLE.

Control next passes to block 84 where a completed lane counter C is incremented. The completed lane counter C is an indication of the number of lanes in the sorting machine 10 whose empty cup counter E have reached the value of the UPDATE CYCLE. Thus, each time an empty cup counter reaches the value of the UPDATE CYCLE, the lane counter is incremented by one, as shown at block 84. Control next passes to block 86 where the value of the completed lane counter is compared to the total number of lanes in the machine. If the value of the completed lane counter is less than the total number of lanes in the machine, control passes back to the START routine 46. On the other hand, if the value of the completed lane counter C equals the total number of lanes in the sorting machine 10, control passes to the remainder of the AUTO REZERO routine as shown at 88. Thus, it will be appreciated that the remainder of the AUTO REZERO routine, as shown in FIG. 4, is not executed until the completed lane counter reaches the total number of lanes in the sorter, i.e., all of the empty cup counters E(L) have reached the value of the UPDATE CYCLE.

The value of the UPDATE CYCLE may be any desired value. Preferably, the value of the UPDATE CYCLE is a power of 2. In the preferred embodiment, the UPDATE CYCLE is selectable by the operator in incremental values of 256, 512, 1024, 2048, etc. up to a maximum of 32,768. Of course, it is undesirable to select a value for the UPDATE CYCLE which is too high or too low. If the value is too high, there may be a long delay between subsequent updates of the average tare, and errors in fruit sorting may occur. On the other hand, if the selected value for the UPDATE CYCLE is too low, accurate average values will not be obtained, and additionally, valuable processing time will be used in updating the average tare value at too frequent intervals.

When the value of the completed lane counter C is equal to the total number of lanes in the sorter, control passes to block 90 where the completed lane counter C is reset to zero and the lane counter L is reset to 1, the first lane. Control then passes to block 92 where the running sum S for the current lane (here the first lane) is retrieved. Control then passes to block 94 where the value of the running sum for the current lane is divided by the value of the UPDATE CYCLE. The result of the division defines an updated average empty cup weight or updated average tare. Control then passes block 96 where the old average empty cup weight or tare previously associated with the current lane, lane L is replaced with the newly computed average cup empty weight or tare. Control then passes to block 98 where the empty cup counter and the running sum for the current lane, lane L, are both reset to zero. Control passes to block 100 where the lane counter is incremented to process the data for the next lane and control passes back to block 92. It will be appreciated that the aforementioned process is repeated for each lane in the sorter until updated average empty cup weights or tares have been computed for each lane. The algorithm determines, at block 102, whether the values have been computed for all lanes, and if so, control passes back to the START routine 64.

It will be appreciated that the disclosed method provides a simple, yet accurate method for updating average empty cup weights or tares used for processing fruit weight data in an article sorting machine. The process requires minimal memory and minimal processing time.

The present invention may be embodied in other specific forms without departing from the spirit or essential attributes thereof and, accordingly, reference should be made to the appended claims, rather than to the foregoing specification, as indicating the scope of the invention.

I claim:

1. A method for updating values representative of average tare stored in a memory section of an electronic controller for an article sorting machine of the type having a plurality of cups connected in a continuous belt for carrying articles to be sorted according to their weight, the cups being transportable over an electronic weight station which provides a weight signal for each cup transported thereover, the weight signal having a value representative of the weight of the cup over the weight station, and if the cup is carrying an article, the weight of the cup and the article, the method comprising the steps of:
    (a) providing via a user operable data entry means data representative of at least one threshold value;
    (b) providing an initial value representative of the average tare and storing the initial value in a selected memory location of the memory section;
    (c) obtaining the weight signal from the weight station each time a cup is transported thereover;
    (d) retrieving the initial value representative of average tare and subtracting the initial value from the value of the weight signal, the resulting value defining an article weight value;
    (e) comparing the article weight value to the threshold value and determining whether the cup is carrying an article based upon the result of the comparison;
    (f) maintaining a running sum of the values of the weight signals for the cups determined not to be carrying articles;
    (g) maintaining an empty cup count representative of the number of cups determined not be be carrying articles;
    (h) dividing the running sum by the empty cup count, the resulting value defining an updated average tare;
    (i) replacing the initial value stored in the selected memory location with the updated average tare; and
    (j) resetting the running sum and the empty cup count only after the empty cup count has reached a preselected value.

2. Method according to claim 1 further comprising:

(a) classifying the article into one of a plurality of weight categories when the cup is determined to be carrying an article;
(b) transporting the cup over a plurality of discharge stations; and
(c) discharging the article from the cup at a selected one of the discharge stations based upon the weight category of the article.

3. Method according to claim 2 further comprising the steps of:
(a) determining when the empty cup count reaches a preselected count;
(b) fixing the running sum at its current value when the empty cup counter reaches the preselected count; and
(c) performing the division only when the preselected count has been reached.

4. Method according to claim 3 whereih the step of providing an initial value representative of average tare comprises operating the sorting machine with all of the cups in an unloaded condition for a selected period of time.

5. Method according to claim 1 wherein the preselected value is a power of two.

6. A method for controlling an article sorting machine of the type having an electronic controller, a plurality of cups connected in a continuous belt for carrying articles to be sorted according to their weight, the cups being transportable over an electronic scale and to plural discharge stations, the electronic scale providing an analog weight signal having a magnitude indicative of the weight of the cup over the scale, and if carrying an article, the weight of the cup and the article, the method comprising the steps of:
(a) providing an initial value representative of the weight of an empty cup;
(b) obtaining the analog weight signal from the scale each time a cup is transported thereover;
(c) providing via a keyboard a plurality of weight cutoff values defining plural weight breaks indicative of the weight categories into which the articles are to be sorted.
(d) providing the analog weight signal to an analog to digital converter and converting the analog weight signal to a digital weight signal;
(e) subtracting the initial value from the value of the digital weight signal, the resulting value defining an article weight value;
(f) comparing the article weight value to the smallest one of the weight cutoff values and determining smallest one of the weight cutoff values and determining whether the cup is carrying an article based upon the result of the comparison;
(g) maintaining a running sum of the values of the digital weight signals for the cups determined not to be carrying articles;
(h) maintaining a count of the number of cups determined not to be carrying articles;
(i) determining when the count has reached a preselected count, and in response to reaching the preselected count, dividing the running sum by the preselected count, the resulting value defining an average empty cup weight value;
(j) replacing the initial value with the average empty cup weight value;
(k) resetting the running sum and the count only after the count has reached the preselected count;
(l) classifying, when the cup is determined to be carrying an article, the article into one of the weight breaks, based upon the article weight value; and (m) transporting the cup over the discharge stations and discharging the article from the cup at a selected one of the discharge stations based upon the weight break into which the article has been classified.

7. Method according to claim 6 wherein the preselected count is a power of two.

8. A method for updating values representative of average tares stored in a memory section of an electronic controller for an article sorting machine of the type having a plurality of lanes of cups for carrying the articles to be sorted according to their weight, each lane having a plurality of cups connected in a continuous belt having a plurality of cups connected in a continuous belt and an average tare representative of the average empty cup weight, an electronic scale and a plurality of discharge stations associated therewith, the cups in each lane being movable over their associated electronic scale, each electronic scale providing a weight signal having a value indicative of the weight of the cup over the scale, and if carrying an article, the weight of the cup and the article, the method comprising the steps of:
(a) providing, for each lane, an initial average tare;
(b) obtaining the weight signal from each scale and providing each weight signal to the electronic controller;
(c) providing via a keyboard coupled to the electronic controller, a plurality of weight cutoff values indicative of the weight classifications into which the articles are to be sorted;
(d) subtracting the initial average tare associated with each lane from the value of the weight signal ated with each lane from the value of the weight signal for the corresponding lane, the resulting values defining article weight values;
(e) comparing the article weight values to the weight break values and determining, for each lane, whether the cup which produced the weight signal is carrying an article, based upon the result of the comparison;
(f) maintaining, for each lane, a running sum of the values of the weight signals for the cups determined not to be carrying articles;
(g) maintaining, for each lane, a count of the number of cups determined not to be carrying articles;
(h) determining, for each lane, whether the count has reached a preselected count and holding the running sum for each lane whose count has reached the preselected count at its current value;
(i) determining when the counts for all lanes have reached the preselected count and dividing the running sum for each lane by the preselected count, the result of the divisions defining new average tares for each lane;
(j) resetting the running sums and the counts for all lanes only after the counts for all lanes have reached the preselected count;
(k) classifying, for each lane having a cup determined to be carrying an article, the article into one of the weight classifications based upon the article weight value; and
(l) transporting the cups over the discharge stations and discharging the articles from the cups at selected ones of the discharge stations based upon the weight classifications into which the articles have been classified.

9. Method according to claim 8 wherein the preselected count is a power of two.

* * * * *